Dec. 30, 1924.
E. L. PFUNDER
1,520,883
CHUCK
Filed Jan. 11, 1924    2 Sheets-Sheet 2
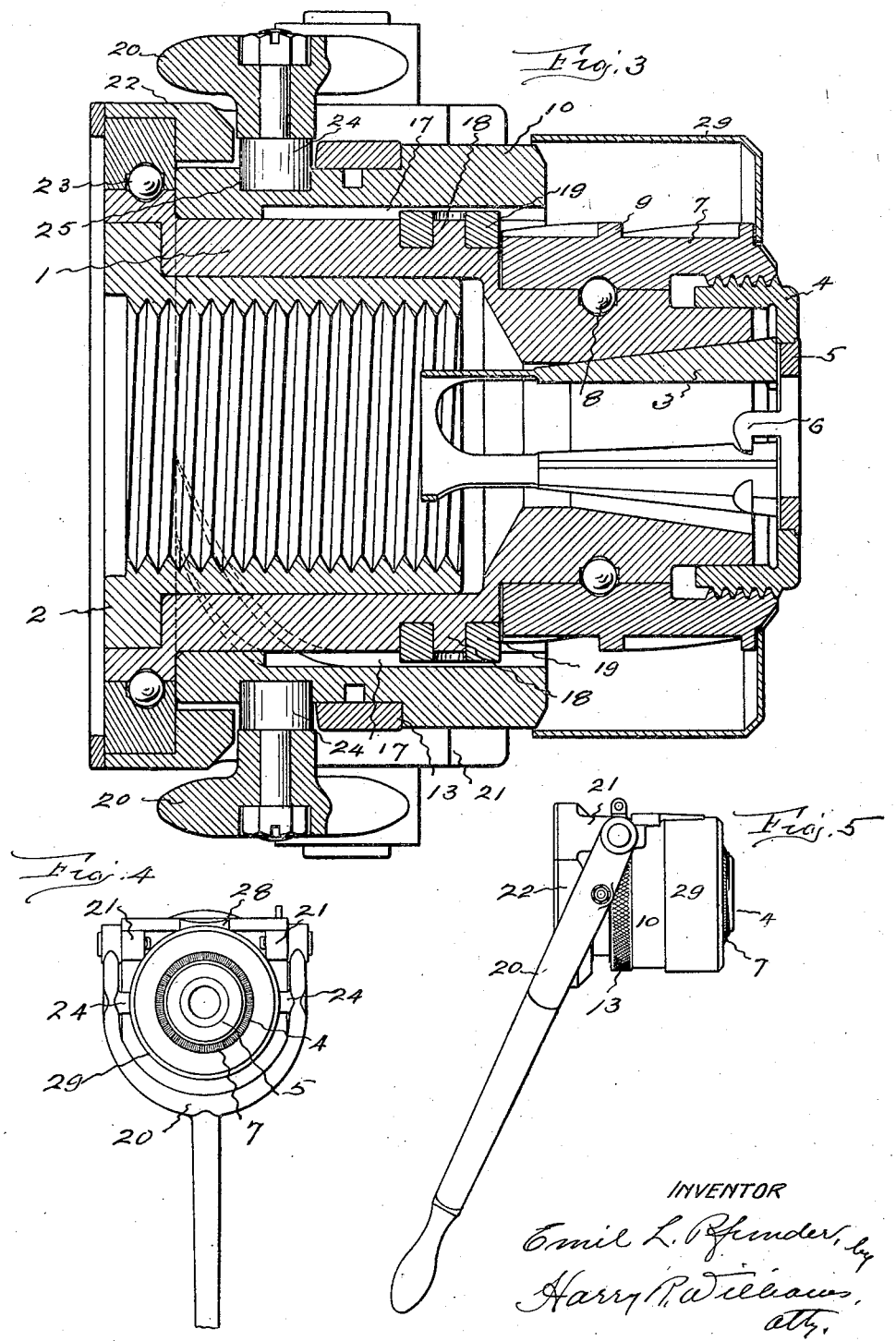
INVENTOR
Emil L. Pfunder, by
Harry R. Williams,
atty.

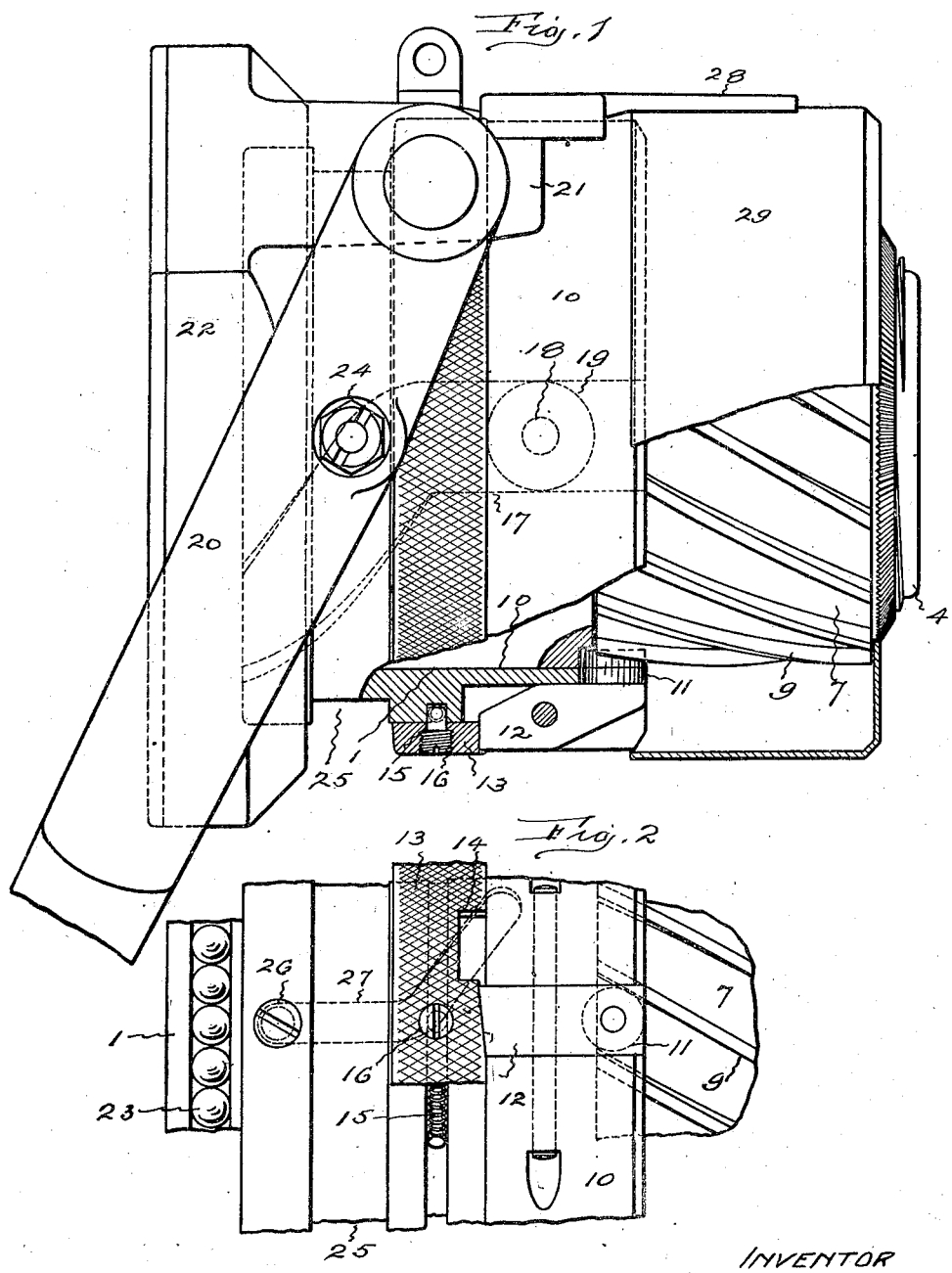

Patented Dec. 30, 1924.

1,520,883

UNITED STATES PATENT OFFICE.

EMIL L. PFUNDER, OF WINDSOR, CONNECTICUT, ASSIGNOR TO THE J. M. NEY COMPANY, OF HARTFORD, CONNECTICUT, A STATUTE CORPORATION OF CONNECTICUT.

CHUCK.

Application filed January 11, 1924. Serial No. 685,520.

*To all whom it may concern:*

Be it known that I, EMIL L. PFUNDER, a citizen of the United States, residing at Windsor, in the county of Hartford and State of Connecticut, have invented a new and useful Improvement in Chucks, of which the following is a specification.

This invention relates to means for operating chucks of the collet type, that is, chucks in which the holding jaws are formed from spring metal and which open and close but slightly, interchangeable collets of various capacities for stock of different sizes and character being provided for one body, which chucks are more especially designed for attachment to the arbors or spindles of lathes, milling machines, screw machines or the like machine tools.

The object of the invention is to provide means which may be manipulated while the machine is running for powerfully closing the collet jaws upon or quickly opening the collet jaws from stock, regardless of variations in the size of the stock, within the maximum range of the collet, the operating means being so designed that the closing movements are first rapid to minimize time and then as the stock is gripped are slow to increase the clamping power, and the opening movements are first slow until the grip on the stock is released so that the release will be easy and then fast to the maximum open position, which movements are effected by the simple movements of a single hand lever.

In attaining this object the collet controlling means are actuated by a rotatory and reciprocatory sleeve which for a part of its travel has a longitudinal movement only in order to obtain the maximum power when the resistance is greatest, and which for the other part of its travel has a rotatory as well as a longitudinal movement which increases the rapidity of action when the resistance is least.

In the accompanying drawings Fig. 1 shows a side view with parts broken away of a chuck constructed according to this invention. Fig. 2 shows a fragmentary view of another side of the chuck. Fig. 3 is a longitudinal section of the chuck. Fig. 4 is an end view of the complete chuck on reduced scale. Fig. 5 is a side view on the reduced scale showing the chuck and its operating handle.

The body 1 of the chuck has an opening in which at the rear is a threaded bushing 2 that provides means for attaching the chuck to the arbor or spindle of the machine with which the chuck is to be used. At the front the opening through the body has tapering walls and in this section is the collet 3 the jaws of which coact with the tapering walls of the opening for causing the collet to grip or release stock. Movable longitudinally only on the front end of the body is a cap 4 provided with a ring 5 having hooked fingers 6 that engage with the collet jaws. When the cap is drawn back the collet is forced in and the jaws constracted. When the cap is moved out the collet is drawn out and the jaws allowed to expand. The cap on the exterior has a thread that is engaged by a thread in a collar 7 which is rotatably mounted on the front end of the body. In the form of chuck illustrated balls 8 are arranged between the body and the collar to hold the collar from longitudinal movement and reduce the friction of rotation. When the collar is turned one way the cap is drawn in and when the collar is turned in the other direction the cap is moved out.

The exterior of the collar has spiral grooves separated by spiral ribs 9. The operating sleeve 10 is fitted upon the body so that it may be moved longitudinally and may also be rotated. At the front end the sleeve carries rolls 11 that lie in and fit the grooves between the spiral ribs on the collar. When the sleeve is moved forward the rolls engage the spiral ribs and turn the collar in one direction, and when the sleeve is drawn back the rolls engaging the ribs turn the collar in the opposite direction. The rolls 11 are mounted on latches 12 that are pivoted to the sleeve. Upon depressing the back ends of the latches the rolls may be raised above the ribs so that the collar may be gripped at its front end and turned for locating the rolls in any of the grooves. This permits the collar and cap to be adjusted to the particular collet being used, or the size of the stock to be gripped, and enables the rolls to be located in the proper grooves to ensure the necessary grip of the collet on the stock. A band 13 is arranged around the sleeve back of the ends of the latches to prevent them from accidentally opening and the rolls becoming dislocated from the positions to which they are adjusted. This band has slots 14 and when the band is turned so that the slots are opposite the ends of the latches the latches may be manipulated for effecting the adjustment of the rolls in the desired grooves. A spring 15 thrusting against a screw stud 16 normally holds the band in position to lock the latches in place.

In the inner wall of the sleeve there are grooves 17 that have a section which extends longitudinally with relation to the axis of rotation and a section which is spiral to the axis of rotation of the sleeve. Mounted on studs 18 formed on the body and extending into these grooves are rolls 19. The rolls on the body entering these grooves act as keys or guides for the sleeve and when the sleeve is slid on the body for a portion of its travel it moves longitudinally only and for the other part of its travel it rotates as well as moves longitudinally.

In Fig. 1 the parts are in the positions occupied when the collet is drawn in and contracted. On the first part of the movement of the sleeve forward from this position, as the rolls 19 are in the straight sections of the grooves 17 the sleeve travels straight and the rolls 11 engaging the spiral ribs 9 rotate the collar powerfully for releasing the grip of the collet on the stock. As the sleeve advances and the rolls 19 enter the spiral sections of the grooves 17 the sleeve is rotated as well as advanced, and this rotation added to the action of the rolls 11 on the spiral ribs 9 turns the collar faster and completes the opening of the collet quickly. When the sleeve is drawn back from open position the key rolls 19 are in the spiral sections of the grooves 17 and turn the sleeve at the same time that the rolls 11 are engaging the ribs 9. This causes a fast travel during the first part of the closing movement of the parts. When the collet is nearly closed the rolls 19 enter the straight sections of the grooves 17 and when the final collet closing movement is effected only by the engagement of the rolls 11 with the spiral ribs 9. In other words the first part of the closing movement and the last part of the opening movement, when but little resistance is offered, is accomplished by the combined action resulting from the rotation of the sleeve and the longitudinal movement of the sleeve, while the last part of the closing movement and the first part of the opening movement, when there is considerable resistance, is accomplished by the longitudinal movement of the sleeve only. As a result of this the action of the chuck is rapid, the closing powerful and the opening easy, and on account of the combination of movements utilized the desired action is obtained with but a short movement of the sleeve, and this enables the chuck to be made comparatively short in length.

For the purpose of reciprocating the sleeve a forked hand lever 20 is pivoted to lugs 21 that project from a casing 22 which surrounds the sleeve and is fastened to the body. Balls 23 are arranged between the back end of the casing and the body for keying the parts together. The hand lever is provided with rolls 24 that lie in a groove 25 in the outer surface of the sleeve. A screw stud 26 is threaded through the sleeve into a slot 27 in the body for the purpose of limiting the movement of the sleeve. This slot 27 has the same angular relation to the parts as do the guide grooves 17 in the sleeve so as not to interfere with the normal movement of the sleeve. Secured to and projecting from the casing is a finger 28 to which is fastened the shell 29 that covers and forms a protection for the sleeve.

The invention claimed is:—

1. In a chuck of the character described in combination with the body and means for controlling the position of a collet in the body, of a sleeve rotatably and longitudinally movable upon the body, means carried by the sleeve for actuating the collet controlling means during the reciprocation of the sleeve, means for reciprocating the sleeve, and means for rotating the sleeve during a part of its reciprocating movements the means for actuating the collet controlling means being also affected thereby for increasing the effect of its reciprocating movements on the collet controlling means.

2. In a chuck of the character described in combination with the body and means for controlling the position of a collet in the body, of a sleeve rotatably and longitudinally movable upon the body and actuating said collet controlling means by each motion, means carried by the sleeve for actuating the collet controlling means, means for moving the sleeve longitudinally, and means for rotating the sleeve during a part of its longitudinal movements.

3. In a chuck of the character described in combination with the body and means for controlling the position of a collet in the body, of a sleeve rotatably and longitudinally movable upon the body and actuating said collet controlling means by each motion, means for moving the sleeve longitudinally, means carried by the sleeve for actuating the collet controlling means during the longitudinal movements of the sleeve, and means arranged between the body and sleeve for rotating the sleeve during a part of its longitudinal movements.

4. In a chuck of the character described in combination with the body and means for controlling the position of a collet in the body, of a sleeve rotatably and longitudinally movable upon the body and actuating said collet controlling means by each motion, means for moving the sleeve longitudinally, means carried by the sleeve for actuating the collet controlling means during the longitudinal movements of the sleeve, and co-operating rolls and grooves between the sleeve and body for rotating the sleeve during a part of its longitudinal movements.

5. In a chuck of the character described in combination with the body and means for controlling the position of a collet in the body, of a sleeve rotatably and longitudinally movable upon the body and actuating said collet controlling means by each motion, means for moving the sleeve longitudinally, rolls carried by the sleeve and engaging the collet controlling means for actuating the same during the longitudinal movements of the sleeve, and means for rotating the sleeve during a part of its reciprocating movements.

6. In a chuck of the character described in combination with the body and a rotatable collar for controlling the position of a collet in the body, of a sleeve rotatably and longitudinally movable upon the body and actuating said collet by each motion, means for moving the sleeve longitudinally, rolls carried by the sleeve and engaging said collar for rotating the collar during the longitudinal movements of the sleeve, and means for rotating the sleeve during a part of its longitudinal movements.

7. In a chuck of the character described in combination with the body and a rotatable collar having spiral ribs for controlling the position of a collet in the body, of a sleeve rotatably and longitudinally movable upon the body and actuating said collet by each motion, means for moving the sleeve longitudinally, rolls carried by the sleeve and engaging said spiral ribs for rotating the collar during the longitudinal movements of the sleeve, and co-operating rolls and grooves between the sleeve and body for rotating the sleeve during a part of its longitudinal movements.

8. In a chuck of the character described in combination with the body and a rotatable collar having spiral ribs for controlling the position of a collet in the body, of a sleeve rotatably and longitudinally movable upon the body and actuating said collet by each motion, means for moving the sleeve longitudinally, rolls carried by the sleeve and engaging said ribs for rotating the collar during the longitudinal movements of the sleeve, means for disengaging said rolls from said ribs for purposes of adjustment, and means arranged between the body and sleeve for rotating the sleeve during a part of its longitudinal movements.

9. In a chuck of the character described in combination with the body and a rotatable collar having spiral ribs for controlling the position of a collet in the body, of a sleeve rotatably and longitudinally movable upon the body and actuating said collet by each motion, means for moving the sleeve longitudinally, rolls carried by the sleeve and engaging said spiral ribs for rotating the collar during the longitudinal movements of the sleeve, and means arranged between the body and sleeve for rotating the sleeve during a part of its longitudinal movements.

10. In a chuck of the character described in combination with the body and a rotatable collar having spiral ribs for controlling the position of a collet in the body, of a sleeve rotatably and longitudinally movable upon the body and actuating said collet by each motion, said sleeve having a partly longitudinal and partly spiral groove in its interior, a roll on the body extending into said groove, rolls carried by the sleeve and engaging said spiral ribs for rotating the collar during the longitudinal movements of the sleeve, and means for moving the sleeve longitudinally.

11. In a chuck of the character described in combination with the body and a rotatable collar having spiral ribs for controlling the position of a collet in the body, of a sleeve rotatably and longitudinally movable upon the body and actuating said collet by each motion, means for moving the sleeve longitudinally, rolls carried by the sleeve and engaging said ribs for rotating the collar during the longitudinal movements of the sleeve, said rolls being mounted on latches pivoted to the sleeve, a locking band for retaining said latches in position, and means for rotating the sleeve during a part of its longitudinal movements.

EMIL L. PFUNDER.